US008180637B2

(12) United States Patent
Yu et al.

(10) Patent No.: US 8,180,637 B2
(45) Date of Patent: May 15, 2012

(54) HIGH PERFORMANCE HMM ADAPTATION WITH JOINT COMPENSATION OF ADDITIVE AND CONVOLUTIVE DISTORTIONS

(75) Inventors: Dong Yu, Kirkland, WA (US); Li Deng, Sammamish, WA (US); Alejandro Acero, Bellevue, WA (US); Yifan Gong, Sammamish, WA (US); Jinyu Li, Atlanta, GA (US)

(73) Assignee: Microsoft Corporation, Redmond, WA (US)

( * ) Notice: Subject to any disclaimer, the term of this patent is extended or adjusted under 35 U.S.C. 154(b) by 1197 days.

(21) Appl. No.: 11/949,044

(22) Filed: Dec. 3, 2007

(65) Prior Publication Data

US 2009/0144059 A1 Jun. 4, 2009

(51) Int. Cl.
G10L 15/00 (2006.01)
G10L 15/20 (2006.01)
G10L 17/00 (2006.01)

(52) U.S. Cl. .................. 704/250; 704/233; 704/236
(58) Field of Classification Search .................. 704/250, 704/233, 236
See application file for complete search history.

(56) References Cited

U.S. PATENT DOCUMENTS

| 5,960,397 | A | * | 9/1999 | Rahim .......................... 704/244 |
|-----------|---|---|--------|----------------------------------------|
| 6,026,359 | A | * | 2/2000 | Yamaguchi et al. ........ 704/256.4 |
| 6,112,175 | A | * | 8/2000 | Chengalvarayan ........ 704/256.5 |
| 6,389,393 | B1 |  | 5/2002 | Gong |
| 6,449,594 | B1 | * | 9/2002 | Hwang et al. .................. 704/233 |
| 6,577,997 | B1 | * | 6/2003 | Gong ............................ 704/252 |
| 6,691,091 | B1 | * | 2/2004 | Cerisara et al. ............... 704/255 |
| 6,915,259 | B2 | * | 7/2005 | Rigazio et al. ................ 704/244 |
| 6,920,421 | B2 | * | 7/2005 | Pao ................................ 704/211 |
| 7,016,837 | B2 | * | 3/2006 | Seo et al. ...................... 704/233 |
| 7,062,433 | B2 |  | 6/2006 | Gong |
| 7,089,182 | B2 |  | 8/2006 | Souilmi et al. |
| 7,103,541 | B2 | * | 9/2006 | Attias et al. ................... 704/226 |
| 7,120,580 | B2 | * | 10/2006 | Rao Gadde et al. .......... 704/233 |
| 7,165,028 | B2 | * | 1/2007 | Gong ............................ 704/233 |
| 7,236,930 | B2 |  | 6/2007 | Bernard et al. |
| 2003/0115055 | A1 | * | 6/2003 | Gong ............................ 704/233 |
| 2003/0220791 | A1 | * | 11/2003 | Toyama ........................ 704/256 |
| 2005/0010410 | A1 |  | 1/2005 | Takiguchi et al. |
| 2005/0228669 | A1 | * | 10/2005 | Bernard et al. ............... 704/256 |
| 2007/0033027 | A1 |  | 2/2007 | Yao |

OTHER PUBLICATIONS

Gales, et al., "Predictive Linear Transforms for Noise Robust Speech Recognition", pp. 1-6, 2007.
Pal, et al., "Noise Robust Speech Recognition Using Gaussian Basis Functions for Non-Linear Likelihood Function Approximation", pp. 1-4, 2002.
Stouten, et al., "Robust Speech Recognition using Model-Based Feature Enhancement", pp. 1-4, 2003.

* cited by examiner

*Primary Examiner* — Eric Yen
(74) *Attorney, Agent, or Firm* — Westman, Champlin & Kelly, P.A.

(57) ABSTRACT

A method of compensating for additive and convolutive distortions applied to a signal indicative of an utterance is discussed. The method includes receiving a signal and initializing noise mean and channel mean vectors. Gaussian dependent matrix and Hidden Markov Model (HMM) parameters are calculated or updated to account for additive noise from the noise mean vector or convolutive distortion from the channel mean vector. The HMM parameters are adapted by decoding the utterance using the previously calculated HMM parameters and adjusting the Gaussian dependent matrix and the HMM parameters based upon data received during the decoding. The adapted HMM parameters are applied to decode the input utterance and provide a transcription of the utterance.

8 Claims, 4 Drawing Sheets

HIGH PERFORMANCE HMM ADAPTATION WITH JOINT COMPENSATION OF ADDITIVE AND CONVOLUTIVE DISTORTIONS

BACKGROUND

The current discussion is directed toward speech recognition. More particularly, the current discussion is directed toward compensating for the effects of additive and convolutive distortions in speech recognition systems.

Building high performance speech recognition systems that are robust to environmental conditions is an ongoing challenge. One of the issues that affect the robustness of speech recognition systems is the existence of many types of distortions, including additive and convolutive distortions and their mixes, which are difficult to be predicted during the development of speech recognizers. As a result, the speech recognition systems usually are trained using clean speech and often suffer significant degradation of performance when used under noisy environments unless compensation is applied.

Different compensation methodologies have been proposed in the past to achieve environmental robustness in speech recognition. In one methodology, distorted speech features are enhanced with advanced signal processing methods. Examples of such processing methods include the European Telecommunications Standards Institute (ETSI) advanced front end (AFE) and stereo-based piecewise linear compensation for environments (SPLICE). In another approach, a speech recognizer operates on its model to adapt or adjust the model parameters to better match the speech recognition system with the actual, distorted environment. Examples of a model-based approach include parallel model combination (PMC) and joint compensation of additive and convolutive distortions (JAC). With an expectation-maximization (EM) method, JAC directly estimates the noise and channel distortion parameters in the log-spectral domain, adjusts the acoustic HMM parameters in the same log-spectral domain, and then converts the parameters to the cepstral domain. However, no strategy for HMM variance adaptation has been given and the techniques for estimating the distortion parameters involve a number of unnecessary approximations in the JAC approaches.

The discussion above is merely provided for general background information and is not intended to be used as an aid in determining the scope of the claimed subject matter.

SUMMARY

In one embodiment, a method of compensating for additive and convolutive distortions applied to a signal indicative of an utterance is discussed. The method includes receiving the signal indicative of an utterance and initializing a noise mean vector and a channel mean vector. The method further includes calculating Gaussian dependent matrix and Hidden Markov Model (HMM) parameters to account for additive and convolutive noises from the noise and channel mean vectors. The HMM parameters are then adapted by decoding the utterance using the previously calculated HMM parameters; and adjusting the Gaussian dependent matrix and the HMM parameters based upon data received during the decoding. The re-adapted HMM parameters are then applied to decode the utterance and provide a transcription of the utterance.

In another embodiment, a method of performing speech recognition on an utterance subjected to additive and convolutive distortions is discussed. The method includes estimating the noise and channel distortions using a nonlinear distortion model in the cepstral domain, adapting static and dynamic portions of means and variances of a Hidden Markov Model (HMM) by applying a Vector-Taylor Series approximation and obtaining a transcript of the utterance by decoding the utterance with the adapted HMM.

In yet another embodiment, a speech recognition system is discussed. The speech recognition system includes a receiver configured to detect an utterance from a user and create a signal indicative of the utterance. The system also includes a recognition engine capable of receiving the signal, performing speech recognition on the signal and providing an output that represents a transcription of the utterance. The recognition engine includes a nonlinear distortion model configured to estimate the additive and convolutive distortions in the cepstral domain and to adapt static and dynamic portions of means and variances of an HMM by applying a Vector-Taylor Series approximation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
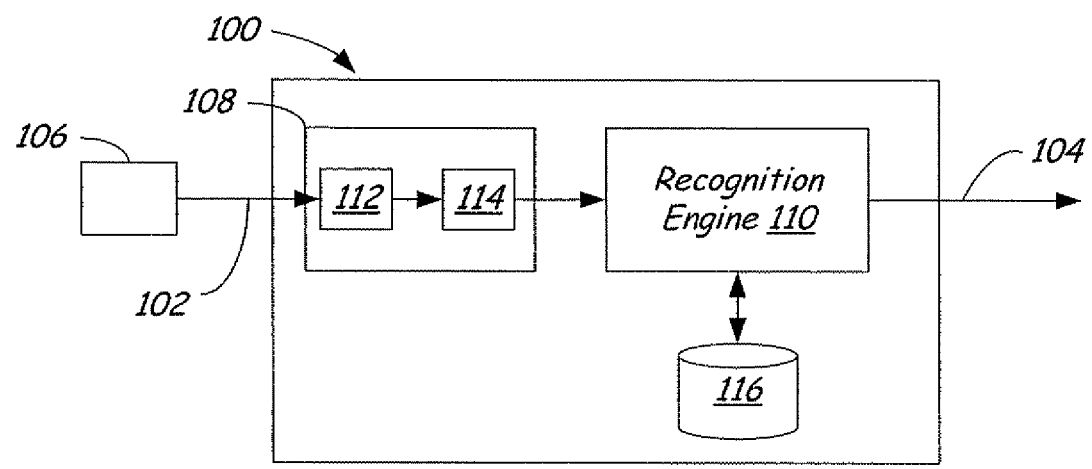
FIG. 1 illustrates a representative speech recognition system of the type in which embodiments of the present discussion may be useful.
Figure 5:
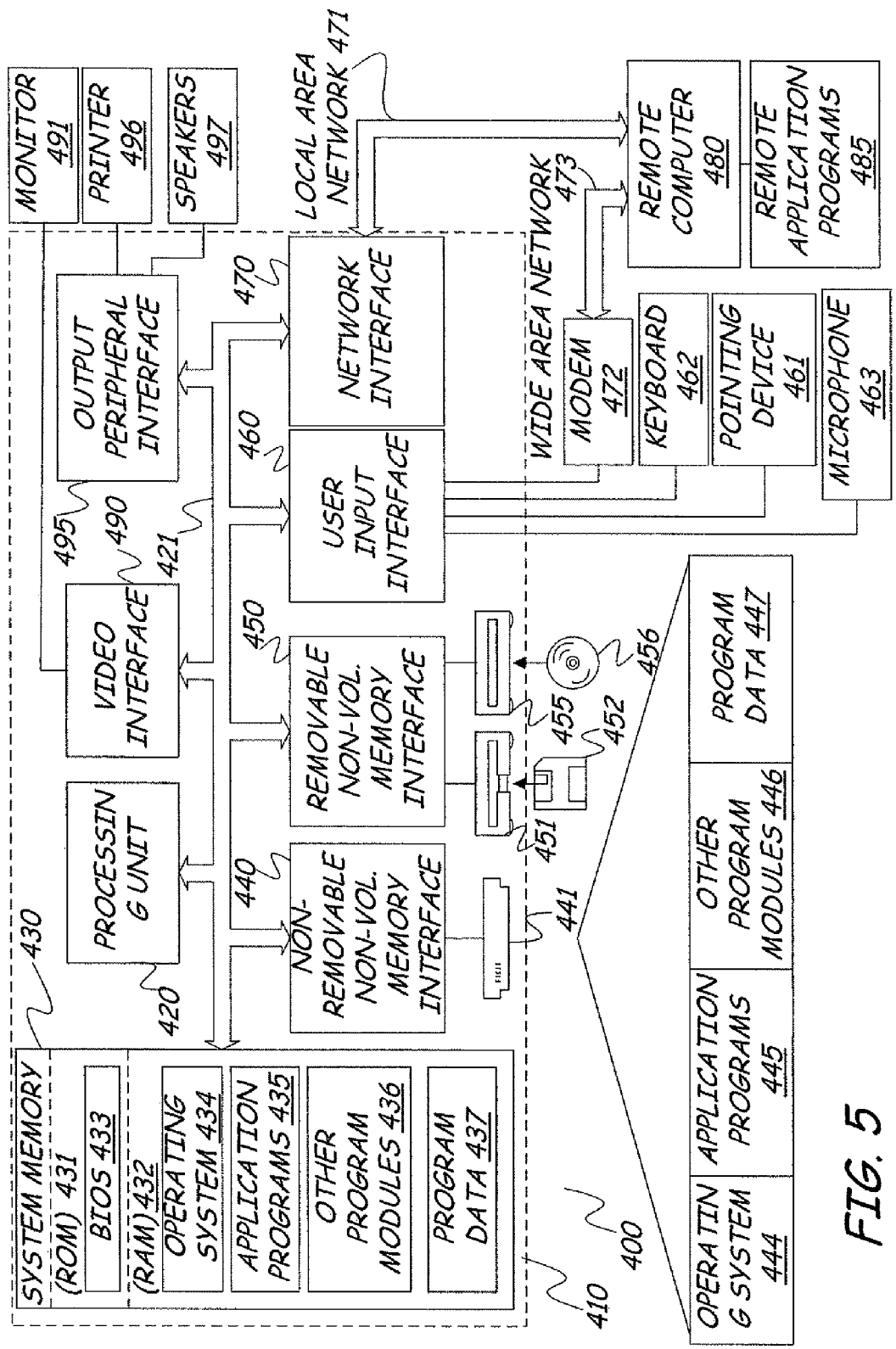
FIG. 5 is a block diagram of one computing environment in which some embodiments may be practiced.

FIG. 1 generally illustrates a speech recognition system 100 that receives an input 102 to provide an output 104. The speech recognition system 100 is illustrated as a type of system that can employ embodiments discussed herein. The input 102 is illustratively an observed speech signal of an utterance provided by a human speaker 106 (although it should be appreciated that any machinery device that can produce sound approximating a human voice can also provide the input 102). The input 102 is provided to an input handling device 108, which receives the input 102 and conditions the input 102 to prepare it to be recognized by a recognition engine 110. The input handling device 108 illustratively includes a pickup device 112, which receives the input from the speaker 106. An example of a suitable pickup device 112 is a microphone such as the microphone 463 as shown in FIG. 5. When the pickup device 112 is exposed to a sound, it provides an indication of that sound to an input signal conditioner 114. The input signal conditioner 114 then conditions the indication and provides a signal to a speech recognition engine 110.

Speech recognition engine 110 illustratively accesses a data store 116, which includes an acoustic model (AM) that is derived from training data that the speech recognition engine 110 employs to assist in the recognition of speech. The AM stored in data store 116 can be based upon so called "clean speech". Such AM does not compensate for distortions. As will be discussed below, the speech recognition engine 110, in some embodiments, operates to compensate for distortions and stores AM that has been so compensated in the data store 116.

Figure 2:
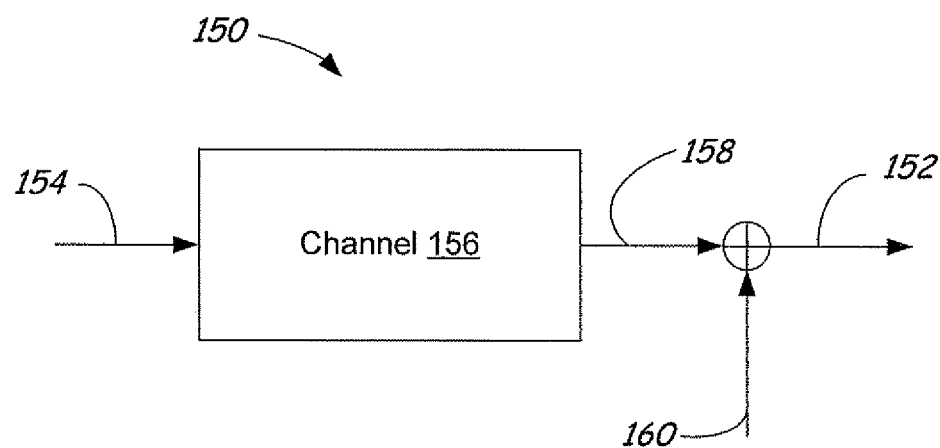
FIG. 2 is a model of input to a speech recognition system illustrating sources of environmental distortion to a signal received from a speech source.

FIG. 2 illustrates a model 150 illustrating an observed speech signal 152 that includes both noise (additive) and channel (convolutive) distortions. The observed speech signal 152 is generated from clean speech signal 154 that is provided to a channel 156. The output 158 of the channel 156 has an environmental noise signal 160 added to it, which creates the observed speech signal 152. The observed speech signal 152 can be represented as $$y[m]=x[m]*h[m]+n[m] \quad (1)$$

where y[m] represents the observed speech signal 152, h[m] represents channel distortion with the * symbol representing the convolutive operation and n[m] represents an additive noise signal from the environment. It should be appreciated that the model 150 is illustrative of the input 102 and input handling device 108 in FIG. 1. The served speech signal 152 thus illustratively represents the signal provided to recognition engine 110 with the distortions illustrated in equation (1). The observed speech signal 152 is thus a degraded speech signal, which is based on clean speech signal 154, but also includes the distortions discussed above.

Given the relationship described above in equation (1), the following equivalent relationships can be established in the spectral domain and in the log-spectral domain by employing discrete Fourier transformations and ignoring the phase:

$$|Y[k]|=|X[k]||H[k]|+|N[k]| \quad (2)$$

$$\log |Y[k]|=\log [|X[k]||H[k]|+|N[k]|] \quad (3)$$

Rearranging and mapping equation (3) to the log-filter-bank domain and then multiplying each side of the equation by a non-square discrete cosine transform (DCT) matrix yields the following nonlinear distortion model:

$$y=x+h+C \log(1+\exp(C^{-1}(n-x-h))) \quad (4)$$

where $C^{-1}$ is the pseudo inverse DCT matrix. The variables y, x, n and h represent the vector-valued distorted speech, clean speech, noise, and channel distortion, respectively, all in the Mel-Frequency Cepstral Coefficient (MFCC) domain. By employing a Vector-Taylor Series (VTS) approximation, equation (4) can be written as:

$$\mu_y \approx \mu_x + \mu_h + C\log(1+\exp(C^{-1}(\mu_n-\mu_x-\mu_h)))$$
$$= \mu_x + \mu_h + g(\mu_x, \mu_h, \mu_n)$$

where $$g(\mu_x,\mu_h,\mu_n)=C \log(1+\exp(C^{-1}(\mu_n-\mu_x-\mu_h)))$$

The VTS expansion is used to approximate the non-linear function, and in one illustrative embodiment is a first order expansion. Variables $\mu_y, \mu_x, \mu_h,$ and $\mu_n$ are the mean vectors of the cepstral signal variables y, x, h, and n, respectively. Taking the derivative of the above equation yields:

$$\frac{\partial \mu_y}{\partial \mu_h} = C \cdot \text{diag}\left(\frac{1}{1+\exp(C^{-1}(\mu_n-\mu_x-\mu_h))}\right) \cdot C^{-1} = G$$

and $$\frac{\partial \mu_y}{\partial \mu_n} = I - G$$

where diag(·) is a diagonal matrix with a diagonal component value equal to the value of the vector in the argument. For the given noise mean vector $\mu_n$ and channel mean vector $\mu_h$, the value of G(·) depends on the mean vector $\mu_x$.

Figure 3:
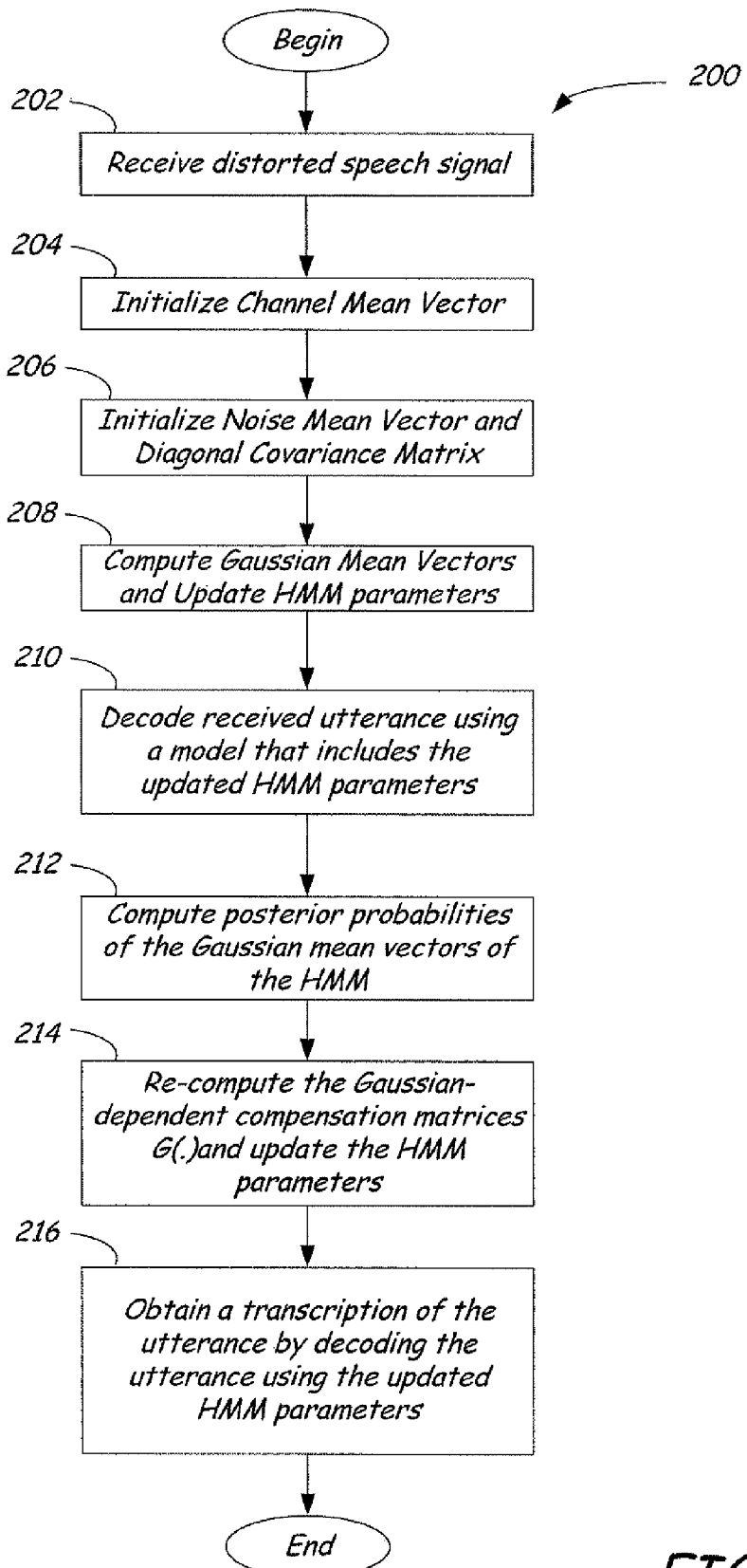
FIG. 3 illustrates a method for performing a joint compensation of additive and convolute distortions on a distorted speech signal prior to performing speech recognition according to one illustrative embodiment.

FIG. 3 illustrates a method 200 of performing a joint compensation of additive and convolute distortions on a distorted speech signal prior to performing speech recognition according to one illustrative embodiment. The method 200 includes receiving a distorted speech signal such as observed speech signal 152 as illustrated in FIG. 2. The receiving of the distorted speech signal is represented by block 202. As discussed above, the observed speech signal 152 illustratively includes both a convolutive distortion component and an additive environmental noise component.

The method 200 further includes initializing the channel mean vector $\mu_h$, represented by block 204. The channel mean vector $\mu_h$ is illustratively set to all zeros during the initialization process. The method 200 further initializes the noise mean vector $\mu_n$ and diagonal covariance matrix, represented in block 206. Both the noise mean vector $\mu_n$ and diagonal covariance matrix are initialized in method 200 by using the first and/or last N (speech free) frames from the utterance received at block 202 using sample estimates.

Once the system has been initialized, the method 200 computes the Gaussian mean vectors and then updates the HMM parameters. This is represented by block 208. The Gaussian dependent compensation matrix for the k-th Gaussian in the j-th state is calculated as:

$$G(j,k) = C \cdot \text{diag}\left(\frac{1}{1+\exp(C^{-1}(\mu_n-\mu_{x,jk}-\mu_h))}\right) \cdot C^{-1}$$

Once the Gaussian dependent compensation matrices G(·) are calculated the HMM parameters are illustratively adapted.

To that end, the first order Vector Taylor Series is applied to obtain the relationship between the Gaussian mean vectors (the k-th Gaussian in the j-th state) in an adapted HMM for the degraded speech and in the original clean-speech HMM. Thus, a VTS approximation is described as:

$$\mu_{y,jk} \approx \mu_{x,jk} + \mu_h + g(\mu_{x,jk}, \mu_h, \mu_n)$$
$$= \mu_{x,jk} + \mu_{h,0} + g(\mu_{x,jk}, \mu_{h,0}, \mu_{n,0}) +$$
$$G(j,k)(\mu_h-\mu_{h,0}) + (I-G(j,k))(\mu_n-\mu_{n,0})$$

where $\mu_{n,0}$ and $\mu_{h,0}$ are the VTS expansion points for $\mu_n$ and $\mu_h$, respectively. The first-order VTS is illustratively applied only to the static portion of the MFCC vector to approximate a non-linear function. The covariance matrix $\Sigma_{y,jk}$ in the adapted HMM can be estimated as a weighted summation of $\Sigma_{x,jk}$, the covariance matrix of the clean HMM, and $\Sigma_n$, the covariance matrix of noise, i.e., $$\Sigma_{y,jk} \approx G(j,k)\Sigma_{x,jk}G(j,k)^T + (I-G(j,k))\Sigma_n(I-G(j,k))^T$$

The channel is illustratively treated as a fixed, deterministic quantity in a given utterance and so no channel variance is taken into account.

For the delta and delta/delta portions of MFCC vectors, the adaptation formulas for the mean vector and covariance matrix are $$\mu_{\Delta y,jk} \approx G(j,k)\mu_{\Delta x,jk}$$

$$\mu_{\Delta\Delta y,jk} \approx G(j,k)\mu_{\Delta\Delta x,jk}$$

$$\Sigma_{\Delta y,jk} \approx G(j,k)\Sigma_{\Delta x,jk}G(j,k)^T + (I-G(j,k))\Sigma_{\Delta n}(I-G(j,k))^T$$

$$\Sigma_{\Delta\Delta y,jk} \approx G(j,k)\Sigma_{\Delta\Delta x,jk}G(j,k)^T + (I-G(j,k))\Sigma_{\Delta\Delta n}(I-G(j,k))^T$$

Once the HMM parameters have been adapted, the utterance received as observed speech signal 102 illustrated in FIG. 1 is illustratively decoded using a model that includes the adapted HMM parameters. This is illustrated by block 210. Following the decoding of the observed speech signal 102, the method computes the posterior probabilities of the Gaussian mean vectors of the HMM parameters provided in block 208. This is illustrated by block 212. The posterior probabilities of the Gaussian mean vectors incorporate the information received by the decoding of the observed speech signal 102 as is illustrated in block 210.

An expectation maximum (EM) algorithm is illustratively developed to estimate the noise and channel mean vectors using the VTS approximation. Let $\Omega_s$ denote the set of states, $\Omega_m$ denote the set of Gaussians in a state, $\theta_t$ denote the state index, and $\epsilon_t$ denote the Gaussian index at time frame t. The symbols $\lambda$ and $\bar{\lambda}$ represent new and old parameter sets, respectively, for the mean of noise and channel. The auxiliary Q function for an utterance is $$Q(\lambda|\bar{\lambda}) = \sum_t \sum_{j \in \Omega_s} \sum_{k \in \Omega_m} p(\theta_t = j, \epsilon_t = k | Y, \bar{\lambda}) \cdot \log p(y_t | \theta_t = j, \epsilon_t = k, \lambda)$$

where $p(y_t|\theta_t=j,\epsilon_t=k,\lambda) \sim N(y_t;\mu_{y,jk},\Sigma_{y,jk})$ is Gaussian with mean vector $\mu_{y,jk}$ and covariance matrix $\Sigma_{y,jk}$. The posterior probability or the k-th Gaussian in the j-th state of the HMM is represented as $\gamma_t(j,k)$ so that $$\gamma_t(j,k) = p(\theta_t=j,\epsilon_t=k|Y,\bar{\lambda})$$

To maximize the auxiliary function in the M-step of the EM algorithm, we take derivative of Q with respect to $\mu_n$ and $\mu_h$, and set the derivatives to zero to obtain $$\sum_t \sum_{j \in \Omega_s} \sum_{k \in \Omega_m} \gamma_t(j,k)(I - G(j,k))^T \sum_{y,jk}^{-1} [y_t - \mu_{y,jk}] = 0, \text{ and}$$

$$\sum_t \sum_{j \in \Omega_s} \sum_{k \in \Omega_m} \gamma_t(j,k)G(j,k)^T \sum_{y,jk}^{-1} [y_t - \mu_{y,jk}] = 0.$$

Substituting the VTS approximation described above into each of the derivative equations shown above yields, in the first instance, a noise mean vector $\mu_n$ that can be solved, given its old estimate, as:

$$\mu_n = \mu_{n,0} + \left\{ \sum_t \sum_{j \in \Omega_s} \sum_{k \in \Omega_m} \gamma_t(j,k)(I-G(j,k))^T \sum_{y,jk}^{-1} (I-G(j,k)) \right\}^{-1} \cdot$$

$$\left\{ \sum_t \sum_{j \in \Omega_s} \sum_{k \in \Omega_m} \gamma_t(j,k)(I - G(j,k))^T \right.$$

$$\left. \sum_{y,jk}^{-1} [y_t - \mu_{x,jk} - \mu_{h,0} - g(\mu_{x,jk}, \mu_{h,0}, \mu_{n,0})] \right\}$$

In the second instance, the channel mean vector is similarly estimated as:

$$\mu_h = \mu_{h,0} +$$

$$\left\{ \sum_t \sum_{j \in \Omega_s} \sum_{k \in \Omega_m} \gamma_t(j,k)G(j,k)^T \sum_{y,jk}^{-1} G(j,k) \right\}^{-1} \cdot \left\{ \sum_t \sum_{j \in \Omega_s} \sum_{k \in \Omega_m} \gamma_t(j,k) \right.$$

$$\left. G(j,k)^T \sum_{y,jk}^{-1} [y_t - \mu_{x,jk} - \mu_{h,0} - g(\mu_{x,jk}, \mu_{h,0}, \mu_{n,0})] \right\}$$

These two equations illustratively describe each iteration of the EM algorithm.

Once the posterior probabilities have been computed and the noise and channel means have been re-estimated as described in conjunction with block 212 above, the method 200 then re-computes the Gaussian-dependent G(.)s and updates the HMM parameters, as discussed above with respect to block 208, given the results obtained in the step 212. This is illustrated in block 214. The step described in block 214 provides a final adapted model that is capable of compensating for noise. The final adapted model is then employed to obtain a transcription of the utterance. This is represented by block 216. The method 200 then returns to block 202 to receive the next distorted speech utterance.

Figure 4:
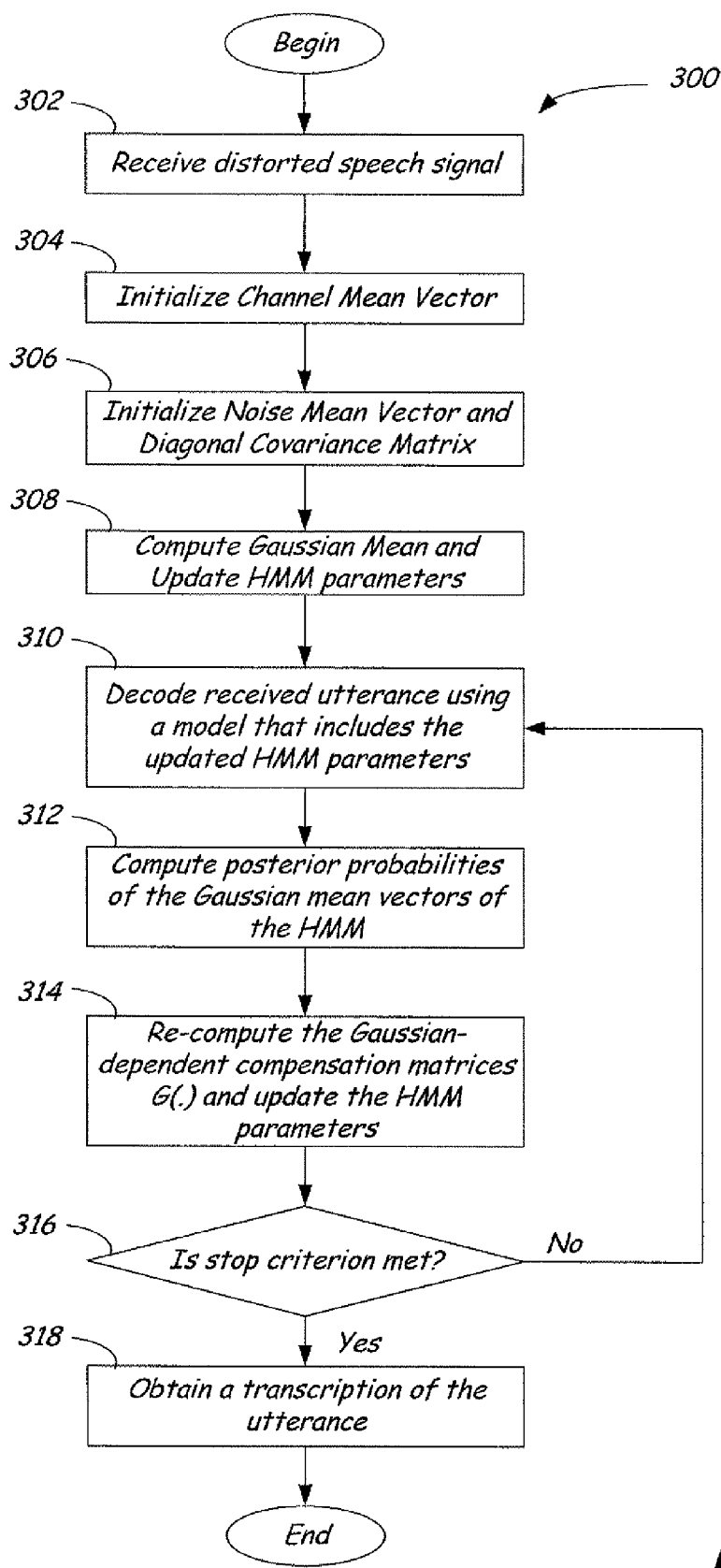
FIG. 4 illustrates a method for performing a joint compensation of additive and convolute distortions on a distorted speech signal prior to performing speech recognition according to another illustrative embodiment.

The method illustrated in FIG. 3 and described above shows a one pass decoding and one-iteration EM re-estimation of noise and channel mean. FIG. 4 illustrates a method 300 that provides for a method that incorporates a multiple pass decoding and multiple-iteration EM re-estimation according to one illustrative embodiment. Method 300 includes several steps that are similar to those discussed above with respect to method 200. Therefore, it should be appreciated that these steps are similar in nature and therefore each step will not be discussed in detail. In block 302, a distorted speech utterance is read into the system. At block 304, the channel mean vector values are cleared, that is, they are set to zero. At block 306, the noise mean vector and the diagonal covariance matrix are initialized. The first and/or last N (speech free) frames from the utterance are used to create simple estimates. At block 308, the method computes a preliminary Gaussian-dependent G(.). The method then uses the preliminary Gaussian-dependent G(.) to adapted the HMM parameters to the noise in the environment. The steps illustrated in blocks 302-308 are substantially similar to the steps illustrated in blocks 202-208 of the method 200 discussed above.

Once the HMM parameters have been adapted, method 300 decodes the utterance received in step 302 with the adapted HMM parameters. This is illustrated in block 310. The step of decoding the utterance is substantially similar to the step illustrated in block 210 above. The speech recognition system utilizes the HMM parameters available at that particular time to decode the utterance.

After the utterance has been decoded, the method 300 computes posterior probabilities, given the decoding results in block 310. This is illustrated in block 312. The methods for calculating posterior probabilities are substantially similar to the methods discussed above with respect to block 212. Once the posterior probabilities are calculated, the noise and channel means are re-estimated. In block 314, the Gaussian dependent matrices are re-calculated and the HMM parameters are updated.

Blocks 310, 312, and 314 represent a single pass through a decoding and EM re-estimation routine. Method 300 includes a plurality of passes through blocks 308, 310 and 312. Block 316 provides a decision point. If the method 300 has met a stop criterion, that is, if the method 300 has made the requisite number of passes, the method 300 has thus created the final adapted model by employing the required number of passes through the decoding and EM re-estimating routine. The method 300 then moves to block 318, in which the method 300 employs the final adapted model (that is, the model that is formed by the plurality of passes through blocks 310, 312, and 314) to obtain the utterance output transcription. If the stop criterion is not met (e.g., the method 300 has not yet made the requisite number of passes through blocks 310, 312, and 314), method 300 moves from block 316 back to block 310 where the utterance is decoded using the newly adapted HMM parameters and another pass through the EM re-estimation routine is performed.

As in method 200, once the final adapted model is used to obtain the utterance output transcription, the method 300 returns to block 302 to read in another distorted speech utterance and apply the method once again to compensate for the distortions. In one illustrative embodiment, illustrated in FIG. 3, the model formed by a previous iteration is discarded (by clearing and re-initializing the vectors in blocks 304 and 306) and a new model is developed. Alternatively, subsequent iterations can retain previously developed HMM parameters as initial values, and therefore bypass the steps of initialing the parameters in blocks 304 and 306. It is to be understood that although not shown in FIG. 2, the method 200 can also use previously developed HMM parameters as initial values as well.

The embodiments discussed above provide several important advantages. By employing a VTS method of re-estimating the noise and channel distortions, the method directly solves the noise and channel distortion in a closed form for each utterance. This provides solutions that are less time consuming, less complex, and more reliable than other approaches. In addition, the methods and systems discussed above provide the flexibility required to adapt dynamic, or delta, portions of HMM mean and variance parameters.

FIG. 5 illustrates an example of a suitable computing system environment 400 on which embodiments such as those discussed above may be implemented. The computing system environment 400 is only one example of a suitable computing environment and is not intended to suggest any limitation as to the scope of use or functionality of the claimed subject matter. Neither should the computing environment 400 be interpreted as having any dependency or requirement relating to any one or combination of components illustrated in the exemplary operating environment 400.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 5, an exemplary system for implementing some embodiments includes a general-purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Any of these storage media can be used to store portions of the speech recognition system 100, including training data, including training that has or has not be compensated for distortions as described above. In addition, portions of the speech recognition engine 110 may also be stored in any one or more of these storage media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during startup, is typically stored in ROM 431. RAM 432 typically contains data and/or program modules that are immediately accessible to and/or presently being operated on by processing unit 420. By way of example, and not limitation, FIG. 5 illustrates operating system 434, application programs 435, other program modules 436, and program data 437.

The computer 410 may also include other removable/non-removable volatile/nonvolatile computer storage media. By way of example only, FIG. 5 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 5, provide storage of computer readable instructions, data structures, program modules and other data for the computer 410. In FIG. 5, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. Examples of program modules and program data in a particular embodiment include portions of the speech recognition engine and training data, respectively, as discussed above.

A user may enter commands and information into the computer 410 through input devices such as a keyboard 462, a microphone 463 (discussed above with respect to specific embodiments), and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 is operated in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 5 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 5 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of compensating for additive and convolutive distortions applied to a signal indicative of an utterance, comprising:

receiving the signal indicative of an utterance;

setting an initial value of a channel mean vector to zero;

utilizing a portion of frames from the signal to set initial values of a noise mean vector and a diagonal covariance matrix;

utilizing the initial values of the channel mean vector, the noise mean vector, and the diagonal covariance matrix to calculate a Gaussian dependent compensation matrix;

utilizing the Gaussian dependent compensation matrix to determine new values of the channel mean vector, the noise mean vector, and the diagonal covariance matrix;

updating Hidden Markov Model (HMM) parameters based on the new values of the channel mean vector, the noise mean vector, and the diagonal covariance matrix to account for the additive and the convolutive distortions applied to the signal;

decoding the utterance using the updated HMM parameters;

re-calculating the Gaussian dependent compensation matrix utilizing information obtained during the utterance decoding;

adapting the HMM parameters based upon the re-calculated Gaussian dependent compensation matrix; and applying the adapted HMM parameters to decode the utterance and provide a transcription of the utterance.

2. The method of claim 1, wherein utilizing a portion of frames from the signal to set an initial value of a noise mean vector includes using simple estimates derived from speech-free frames in the utterance.

3. The method of claim 2, wherein using simple estimates includes calculating an average of the speech-free frames.

4. The method of claim 1, wherein utilizing information obtained during the utterance decoding includes utilizing posterior probabilities.

5. The method of claim 1, wherein updating the HMM parameters includes applying a Vector Taylor Series expan sion approach with the Gaussian dependant compensation matrix to approximate a relationship between the updated HMM parameters and a clean-speech HMM.

6. The method of claim 1, wherein calculating a Gaussian dependent compensation matrix includes utilizing a non-square discrete cosine transform matrix.

7. The method of claim 6, wherein calculating a Gaussian dependent compensation matrix further includes utilizing a diagonal matrix.

8. The method of claim 7, wherein a value of the diagonal matrix is dependent upon a value of a mean vector.

* * * * *